US012711258B2

(12) United States Patent
Ravinuthala et al.

(10) Patent No.: US 12,711,258 B2
(45) Date of Patent: Aug. 18, 2026

(54) AUTHENTICATED DATA ACCESS USING MASKED CREDENTIAL DATA

(71) Applicant: State Farm Mutual Automobile Insurance Company, Bloomington, IL (US)

(72) Inventors: Satya Ravinuthala, Normal, IL (US); Suresh Kumar Alluri, Secunderabad (IN)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 223 days.

(21) Appl. No.: 18/327,701

(22) Filed: Jun. 1, 2023

(65) Prior Publication Data

US 2024/0403464 A1 Dec. 5, 2024

(51) Int. Cl.
*G06F 21/62* (2013.01)
*H04L 9/40* (2022.01)

(52) U.S. Cl.
CPC .......... *G06F 21/6218* (2013.01); *H04L 63/08* (2013.01)

(58) Field of Classification Search
CPC ............................ G06F 21/6218; H04L 63/08
See application file for complete search history.

(56) References Cited

U.S. PATENT DOCUMENTS 5,867,175 A * 2/1999 Katzenberger .......... G06T 13/00 345/473
6,275,941 B1 * 8/2001 Saito ...................... G06F 21/41 713/182
6,671,875 B1 * 12/2003 Lindsey ............. G06F 9/45512 714/E11.21
6,934,706 B1 8/2005 Mancuso et al.
7,636,852 B1 * 12/2009 Balasubramanian ... G06F 21/41 713/182
7,665,127 B1 * 2/2010 Rao .................... H04L 63/0815 726/20
8,037,515 B2 10/2011 Lundblade
8,424,077 B2 4/2013 Adams et al.
8,621,647 B1 * 12/2013 Tinnes .................. G06F 21/57 726/4
8,656,482 B1 * 2/2014 Tosa .................. G06F 9/45558 713/153
8,739,308 B1 * 5/2014 Roth ..................... G06F 21/60 726/32

(Continued)

*Primary Examiner* — Aravind K Moorthy
(74) *Attorney, Agent, or Firm* — Lee & Hayes, P.C.

(57) ABSTRACT

Techniques for authenticated data retrieval and/or storage using masked credential data are described. In accordance with some of the techniques described herein, a method includes receiving a data retrieval request associated with accessing target data stored on a cloud storage platform; providing a credential data request associated with the data retrieval request and the cloud storage platform to a credential data management server; based on the credential data request, receiving credential data from the credential data management server; determining a field of a data retrieval script based on the credential data; and executing the data retrieval script based on the field, wherein executing the data retrieval script includes establishing an authenticated connection with the cloud storage platform and accessing the target data using the authenticated connection.

16 Claims, 7 Drawing Sheets

(56) References Cited

U.S. PATENT DOCUMENTS 8,996,857 B1* 3/2015 Akella .................... G06F 21/41 713/153
9,203,620 B1* 12/2015 Nyström ............... H04L 9/3234
9,215,076 B1* 12/2015 Roth ..................... H04L 9/3247
9,225,690 B1* 12/2015 Fitch ....................... H04L 63/04
9,483,627 B1* 11/2016 Ferg ...................... H04L 63/083
9,503,922 B1* 11/2016 Ford ........................ H04W 4/60
9,954,828 B1* 4/2018 Chandrasekhar ..... H04L 9/0894
10,079,854 B1* 9/2018 Scott ....................... H04L 67/02
10,108,432 B1* 10/2018 Subbiah .............. G06F 9/45512
10,284,532 B2 5/2019 Quinlan et al.
10,306,061 B1* 5/2019 Sumner ............... H04M 3/5166
10,404,477 B1* 9/2019 Deck ..................... H04L 9/3247
10,459,719 B1* 10/2019 Edwards ............. G06F 9/44526
10,686,766 B2 6/2020 Jahner et al.
10,698,794 B1* 6/2020 Ganesan ................. H04L 67/34
10,789,328 B1* 9/2020 Jadhav .................. H04L 63/168
11,005,910 B1* 5/2021 He ......................... G06Q 10/10
11,038,847 B1* 6/2021 Das ......................... H04L 63/18
11,115,224 B1* 9/2021 Scofield ................ H04L 9/0825
11,277,415 B1* 3/2022 Rinehart ............... H04L 9/0891
11,386,107 B1* 7/2022 Walker .................. G06F 16/211
11,665,150 B2* 5/2023 Stachura ............. H04L 63/0807 713/168
11,763,007 B1* 9/2023 Nalluri .................. G06F 21/577 726/25
12,170,656 B1* 12/2024 Miseiko ................ H04L 63/166
2002/0046170 A1* 4/2002 Gvily .................... H04L 63/083 705/42
2002/0091757 A1* 7/2002 Cuomo ................... H04L 63/08 713/155
2002/0138739 A1* 9/2002 Scheetz ............... H04L 63/0823 713/185
2002/0169956 A1* 11/2002 Robb .................. G06F 21/6218 713/166
2003/0079030 A1* 4/2003 Cocotis ................. G06F 3/1226 709/229
2003/0188201 A1* 10/2003 Venkataramappa ......................... H04L 63/083 726/6
2004/0158746 A1* 8/2004 Hu ...................... H04L 63/0815 726/8
2004/0179683 A1* 9/2004 von Behren .......... H04L 63/061 380/44
2006/0190236 A1* 8/2006 Malloy ................. H04L 41/145 703/22
2006/0262915 A1* 11/2006 Marascio ............ H04L 65/1063 379/201.01
2007/0150610 A1* 6/2007 Vassilev .................. H04L 63/08 709/230
2007/0157303 A1* 7/2007 Pankratov ............... H04L 67/14 726/11
2008/0077791 A1* 3/2008 Lund ..................... H04L 9/3273 713/156
2008/0077796 A1* 3/2008 Lund ................... H04L 63/0823 713/173
2008/0098479 A1* 4/2008 O'Rourke ........... H04L 63/1433 726/25
2009/0019352 A1* 1/2009 Afshar ...................... G06F 8/34 717/136
2009/0064311 A1* 3/2009 Clark ..................... G06Q 20/10 726/14
2009/0083517 A1* 3/2009 Riddle .................... G06F 9/526 712/30
2009/0089681 A1* 4/2009 Gottipati ............. G06F 12/1458 726/19
2009/0161547 A1* 6/2009 Riddle .................... G06F 9/526 370/395.7
2009/0199276 A1* 8/2009 Schneider ........... H04L 63/0815 726/5
2009/0276833 A1* 11/2009 Paul .................... G06F 12/1458 726/4
2010/0100868 A1* 4/2010 Shukla ...................... G06F 8/34 717/109
2010/0115268 A1* 5/2010 Kudo .................... H04L 9/3263 726/4
2010/0138922 A1* 6/2010 Zaifman ............. G06F 21/6218 707/E17.014
2010/0153939 A1* 6/2010 Stall .................... G06F 11/3624 717/158
2010/0205662 A1* 8/2010 Ibrahim .............. H04L 65/1104 705/1.1
2010/0319060 A1* 12/2010 Aiken ..................... H04L 63/10 726/5
2011/0055310 A1* 3/2011 Shavlik ..................... G06F 8/20 709/202
2011/0145891 A1* 6/2011 Bade ................... H04L 63/1466 726/4
2012/0291126 A1* 11/2012 Lagar-Cavilla ..... H04W 12/128 726/22
2012/0331110 A1* 12/2012 Scoda ..................... G06F 9/541 709/219
2013/0086388 A1* 4/2013 Tesch .................... H04L 9/3236 713/182
2013/0133051 A1* 5/2013 Riemers .............. G06F 21/6218 726/7
2013/0312061 A1* 11/2013 Casals Andreu ....... G06F 21/40 726/3
2014/0149978 A1* 5/2014 Subramanya ....... G06F 9/45512 718/1
2014/0331279 A1* 11/2014 Aissi ....................... G06F 21/57 726/1
2014/0372508 A1* 12/2014 Fausak .................... H04L 67/02 709/203
2014/0380406 A1* 12/2014 Saidi ..................... H04W 12/35 726/16
2015/0067759 A1* 3/2015 Beard ..................... H04L 63/10 726/1
2015/0074655 A1* 3/2015 de Lima Ottoni ........ G06F 8/52 717/154
2015/0089608 A1* 3/2015 Nandyala ................ H04L 63/20 726/6
2015/0312833 A1* 10/2015 Gresset ................. H04W 36/20 370/329
2015/0350234 A1* 12/2015 Reno ....................... H04L 67/02 726/25
2016/0019275 A1* 1/2016 Mosko .................. H04L 65/612 707/610
2016/0077897 A1* 3/2016 Tsang ...................... G06F 9/541 719/328
2016/0147578 A1* 5/2016 Biesack .................. H04L 67/02 719/328
2016/0232370 A1* 8/2016 Rissanen ................. G06F 21/31
2016/0234209 A1* 8/2016 Kahol ................. H04L 63/0884
2016/0301769 A1* 10/2016 Trost ....................... H04L 67/10
2016/0315772 A1* 10/2016 McCallum ............ H04L 9/3033
2017/0017955 A1* 1/2017 Stern ..................... G06F 21/645
2017/0090963 A1* 3/2017 Nakajima ........... G06F 9/45558
2017/0103221 A1* 4/2017 Goel ................... G06F 11/3636
2017/0118215 A1* 4/2017 Varadarajan ............ H04L 63/10
2017/0195319 A1* 7/2017 Gerber ................... G06Q 20/34
2017/0279795 A1* 9/2017 Redberg .............. H04L 63/0861
2017/0300403 A1* 10/2017 Ramraz ............... G06F 11/3414
2018/0027050 A1* 1/2018 Pogrebinsky ......... G06F 9/5072 709/223
2018/0034802 A1* 2/2018 Shelton ................... G06F 21/31
2018/0124033 A1* 5/2018 Greenspan .............. G06F 21/31
2018/0253818 A1* 9/2018 John ...................... G06N 20/00
2018/0255021 A1* 9/2018 Pellizzer ................. G06F 21/62
2018/0278607 A1* 9/2018 Loladia ............... H04W 12/068
2018/0307853 A1* 10/2018 Mehta .................. G06F 16/185
2018/0324211 A1* 11/2018 Doshi ................. H04L 63/1458
2018/0349890 A1* 12/2018 Dave .................. G06Q 20/3672
2019/0042766 A1* 2/2019 Pappachan ............ H04L 9/0819
2019/0052629 A1* 2/2019 Manepalli ............. H04W 12/06
2019/0089699 A1* 3/2019 Krishnamurthy ....... H04W 4/16
2019/0116160 A1* 4/2019 Bhat ....................... H04L 63/08
2019/0132291 A1* 5/2019 Zhao ................... G06F 9/45558
2019/0294779 A1* 9/2019 Suneja ................ G06F 9/45545

(56) References Cited

U.S. PATENT DOCUMENTS

2019/0310879 A1* 10/2019 Singleton, IV ......... H04L 67/10
2019/0327209 A1* 10/2019 Seferiadis ........... H04L 61/5007
2020/0019413 A1* 1/2020 Spence ................... G06F 9/542
2020/0036699 A1* 1/2020 Suresh .................. H04L 63/083
2020/0076792 A1* 3/2020 Ray ..................... H04L 63/0815
2020/0106776 A1* 4/2020 Ito ...................... H04N 1/00244
2020/0120098 A1* 4/2020 Berg ..................... H04L 63/104
2020/0120507 A1* 4/2020 Srinivasan ............. G06F 21/35
2020/0127992 A1* 4/2020 Pham .................... H04L 9/3231
2020/0142660 A1* 5/2020 Borkar ................ H04L 65/1089
2020/0145419 A1* 5/2020 Yitbarek ............. H04L 63/0853
2020/0212639 A1* 7/2020 Zimmermann ..... G06F 13/4282
2020/0349468 A1* 11/2020 Arya ..................... G06F 18/214
2021/0036851 A1* 2/2021 Villapakkam ......... G06F 21/602
2021/0044618 A1* 2/2021 Lofthouse ........... H04L 63/1475
2021/0056262 A1* 2/2021 Siram .................. G06F 40/154
2021/0064685 A1* 3/2021 Weizman ............. G06F 9/3871
2021/0097190 A1* 4/2021 Scrivano ............. G06F 21/6218
2021/0149895 A1* 5/2021 Tran .................... G06F 16/2452
2021/0250346 A1* 8/2021 Farre Guiu ............. G10L 17/00
2021/0281547 A1* 9/2021 Seitz ..................... H04L 63/083
2021/0365256 A1* 11/2021 Cadarette .............. H04L 63/102
2022/0038459 A1* 2/2022 Berry .................... H04L 63/108
2022/0129564 A1* 4/2022 Hecht ..................... G06F 21/53
2022/0210156 A1* 6/2022 Shah ................... H04L 63/0815
2022/0236998 A1* 7/2022 Roehl ..................... H04L 67/34
2022/0263818 A1* 8/2022 Corella ................. H04L 9/3231
2022/0263841 A1* 8/2022 Bulgakov ............ G06Q 20/383
2022/0343319 A1* 10/2022 Murao .................... H04L 67/02
2022/0345458 A1* 10/2022 Kumarji ................ H04L 63/102
2022/0405756 A1* 12/2022 Vallières-Lagacé .... G06F 21/31
2023/0023350 A1* 1/2023 Singhal ................. H04W 12/77
2023/0161636 A1* 5/2023 Manchikalapati .... G06F 9/5055 718/104
2023/0229788 A1* 7/2023 Pieno ................ G06F 16/24552 726/25
2023/0230091 A1* 7/2023 Vaughn ............. G06Q 20/4016 705/71
2023/0254167 A1* 8/2023 Duong .................. H04L 9/0891 713/168
2023/0262047 A1* 8/2023 Almuhaisin .......... H04L 63/168 726/4
2023/0289389 A1* 9/2023 Leedekerken ...... G06F 16/9532
2024/0007455 A1* 1/2024 Sarkar ..................... G06F 9/451
2024/0021041 A1* 1/2024 Chigurupati ............ G06F 21/35
2024/0111665 A1* 4/2024 Berko ................. G06F 11/3692
2024/0323216 A1* 9/2024 Gershanov ............ G06F 21/577
2024/0333697 A1* 10/2024 Sethi ..................... G06F 16/214
2024/0396764 A1* 11/2024 Stoick ..................... H04L 69/40

* cited by examiner

FIG. 4
400
Credential Profile Determination Module 402
Credential Retrieval Module 404
Local Credential Storage Module 406
Local Connection Establishment Module 408
Target Data Storage Module 410
Data Storage Script 420

FIG. 6
600
App1, User1
Cloud Storage
Credentials
602
App1, User1
Local Storage
Credentials
604
App1, User2
Cloud Storage
Credentials
606
App1, User2
Local Storage
Credentials
608
App2, User1
Cloud Storage
Credentials
610
App2, User1
Cloud Storage
Credentials
612
Credential Data Management Server 620

AUTHENTICATED DATA ACCESS USING MASKED CREDENTIAL DATA

TECHNICAL FIELD

The present disclosure relates to data security applications, and more particularly to establishing an authenticated connection using credential data.

BACKGROUND

In some cases, data security requirements associated with an application system may require that, when a user uses the application system to access a storage platform based on credential data associated with the application system, the credential data is masked such that the user does not have direct access to the credential data and does not know what the credential data entails. For example, in an environment in which credential data is shared across an organization and/or company, if a user is granted user-level access privileges to use an application server that establishes an authenticated connection with a target data storage platform, then the user may have direct access to the credential data absent data security precautions.

Enabling data retrieval or storage using masked credential data becomes specially challenging when the user that requests data retrieval and/or storage is granted user-level (as opposed to administrator-level) access to an application server. The reason this problem is challenging is that, while masking credential data is important for various data security protocols and applications, enabling user-level access to an application server can expose data used, retrieved, and/or stored by the application server to the user. Therefore, there exists a need for a solution that enables a user who has user-level access to an application server to use the application server to retrieve and/or store data using authenticated connections that are established based on masked credential data.

Examples of the techniques described in the present disclosure are directed to overcoming the deficiencies noted above.

SUMMARY

In some aspects, the techniques described herein relate to a computer-implemented method, including: receiving, by a processor of an application server and from a client device, a data retrieval request associated with accessing target data stored on a cloud storage platform; providing, by the processor, a credential data request associated with the data retrieval request and the cloud storage platform to a credential data management server; based on the credential data request, receiving, by the processor, credential data from the credential data management server; storing, by the processor, the credential data in a field of a data retrieval script; and executing, by the processor, the data retrieval script based on the field, wherein executing the data retrieval script includes establishing an authenticated connection with the cloud storage platform and accessing the target data using the authenticated connection.

In additional examples, the techniques described herein relate to a computing system, including: a processor; and memory storing computer-executable instructions that, when executed by the processor, cause the computing system to perform operations including: receiving, by the processor of an application server and from a client device, a data retrieval request associated with accessing target data stored on a cloud storage platform; providing, by the processor, a credential data request associated with the data retrieval request and the cloud storage platform to a credential data management server; based on the credential data request, receiving, by the processor, credential data from the credential data management server; storing, by the processor, the credential data in a field of a data retrieval script; and executing, by the processor, the data retrieval script based on the field, wherein executing the data retrieval script includes establishing an authenticated connection with the cloud storage platform and accessing the target data using the authenticated connection.

In further examples, the techniques described herein relate to one or more non-transitory computer-readable media storing computer-executable instructions that, when executed by the processor, cause the one or more processors to perform operations, including: receiving, by the processor of an application server and from a client device, a data retrieval request associated with accessing target data stored on a cloud storage platform; providing, by the processor, a credential data request associated with the data retrieval request and the cloud storage platform to a credential data management server; based on the credential data request, receiving, by the processor, credential data from the credential data management server; storing, by the processor, the credential data in a field of a data retrieval script; and executing, by the processor, the data retrieval script based on the field, wherein executing the data retrieval script includes establishing an authenticated connection with the cloud storage platform and accessing the target data using the authenticated connection.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
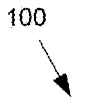
FIG. 1 provides an example architecture for authenticated data retrieval and/or storage with masked credential data.
Figure 1:
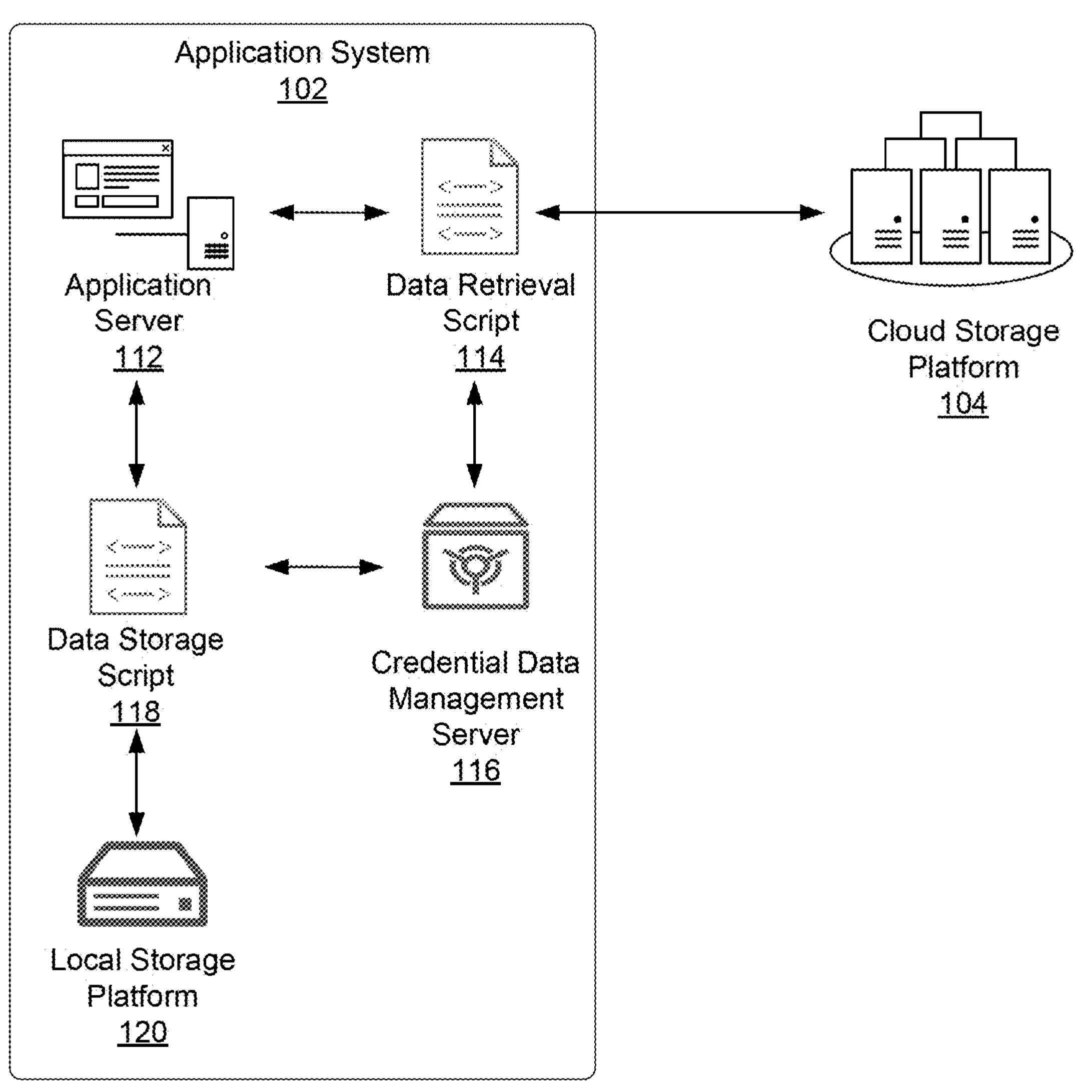

This disclosure describes techniques for authenticated data retrieval and/or storage using an authenticated connection that is established using masked credential data while the user that requests data retrieval and/or storage is granted user-level (as opposed to administrator-level) access to an application server. The techniques described herein enable data retrieval and/or data storage based on a user request and using an authenticated connection that is established between an application server giving user-level access privileges to the user and a data storage platform. In some cases, the authenticated connection is established using masked credential data.

To enable data retrieval and/or storage using masked credential data while granting user-level access to the requesting user, the techniques described herein utilize at least one of the following techniques: (i) storing credential data in a credential data management server that is separate from an application server used to connect to a data storage platform, (ii) executing a data retrieval script or a data storage script using a root process of the application server that is not accessible by a user that is given user-level access to the application server, and (iii) storing credential data retrieved from a credential data management server as a local variable of a data retrieval script or a data storage script.

In accordance with some of the techniques described herein, a credential data management server enables storing and retrieving credential data (e.g., one or more credential tokens) associated with an application system that includes an application server. In some cases, the credential data management server that is associated with an application system is separate from the application server that is in the application system. In some cases, because credential data associated with an application system are stored not on the application server in the application system but on a credential data management server that is separate from the application system, a user having user-level access privileges to the application server will not have direct access to the credential data on a permanent basis, as transmission of credential data to the application server requires a request to the credential data management server. Storing credential data on a credential data management server that is separate from an application server on which a user of the application system has user-level access privileges provides a first layer of protection against direct access to the credential data by unauthorized users (e.g., by non-administrator users of the application server that do not have access to a root process of the application server).

In accordance with some of the techniques described herein, the credential data management server is configured to provide credential data only based on (e.g., in response to) a request that is contained within a data retrieval or storage script that is executed by a root process of an application server. Accordingly, to retrieve credential data needed for accessing a storage platform from a credential data management server, a user of the application server needs to cause execution of a data retrieval or storage script by a root process of an application server. For example, the user can use a non-root process to request that the root process executes a data retrieval or storage script. Requiring that a successful request for retrieval of credential data is provided using a data retrieval or storage script that is executed by a root process of the application server provides a second layer of protection against direct access to the credential data by unauthorized users (e.g., by non-administrator users of the application server that do not have access to a root process of the application server).

In accordance with some of the techniques described herein, after a data retrieval or storage script retrieves credential data needed for establishing an authenticated connection to a data storage platform, the data retrieval or storage script stores the credential data using a local variable of the script that is not accessible outside of the script. Without having access to a root process of the application server that executes the data retrieval or storage script and/or without having access to the data stored in a local variable of the script during an execution of the script by the root process, a user having user-level access privileges to an application server cannot directly access the credential data.

Accordingly, the techniques described herein enable establishing an authenticated connection between an application server and a data storage platform using masked credential data that is not directly accessible by a user having user-level access privileges to the application system. Storing credential data retrieved using a data retrieval or storage script in a local variable of the script provides a third layer of protection against direct access to the credential data by unauthorized users (e.g., by non-administrator users of the application server that do not have access to a root process of the application server).

Thus, the techniques described herein enable one or more layers of protection against direct access to the credential data by unauthorized users (e.g., by non-administrator users of the application server that do not have access to a root process of the application server). The techniques described herein enhance the data security of an application server that is used to retrieve data from a data storage platform and/or store data on a data storage platform. Additionally, the techniques described herein enable data retrieval and/or data storage based on a user request and using an authenticated connection that is established between an application server giving user-level access privileges to the user and a data storage platform. In some cases, the authenticated connection is established using masked credential data.

For example, the techniques described herein include at least one of the following operations: receiving, by a processor of an application server and from a client device, a data retrieval request associated with accessing target data stored on a cloud storage platform; providing, by the processor, a credential data request associated with the data retrieval request and the cloud storage platform to a credential data management server; based on the credential data request, receiving, by the processor, credential data from the credential data management server; determining, by the processor, a field of a data retrieval script based on the credential data; or executing, by the processor, the data retrieval script based on the field, wherein executing the data retrieval script includes establishing an authenticated connection with the cloud storage platform and accessing the target data using the authenticated connection.

As another example, the techniques described herein include at least one of the following operations: receiving, by a processor and from a client device, a data storage request associated with storing target data in a local storage platform, wherein the local storage platform includes a component of an application system and the application system also includes the application server; providing, by the processor, a credential data request associated with the data storage request and the local storage platform to a credential data management server; based on the credential data request, receiving, by the processor, credential data from the credential data management server; determining, by the processor, a field of a data storage script based on the additional credential data; and executing, by the processor, the data storage script based on the field of the data storage script, wherein executing the data storage script includes establishing an additional authenticated connection with the local storage platform and storing the target data using the additional authenticated connection.

FIG. 1 provides an example architecture 100 for authenticated data retrieval and/or storage with masked credential data. As depicted in FIG. 1, the architecture 100 includes an application system 102 and a cloud storage platform 104.

The cloud storage platform 104 may be a data storage platform that is remote from the application system 102, such that accessing the cloud storage platform 104 using the application system 102 requires establishment of a networked connection (e.g., a public internet connection or a dedicated private network connection) between the application system 102 and the cloud storage platform 104. Examples of cloud storage platforms include the Amazon® Web Services (AWS) platform, the Microsoft® Azure platform, the Google® Cloud platform, and/or the like.

The application system 102 may enable retrieval of data from a data storage platform and/or storage of data on a data storage platform based on a data retrieval request and/or a data storage request provided by a user (e.g., a user of the application system 102 and/or a user of a client system that is connected to the application system 102 via a networked connection).

For example, the application system 102 may enable retrieval of data from the cloud storage platform 104 and storage of the retrieved data on a local storage platform 120 of the application system 102. As another example, the application system 102 may enable retrieval of data from the local storage platform 120 and storage of the retrieved data on the cloud storage platform 104. As a further example, the application system 102 may enable storage of data retrieved from at least one of the local storage platform 120 or the cloud storage platform 104 on a client system that is used by a requesting user. As an additional example, the application system may enable storage of data retrieved from a client system that is used by a requesting user on at least one of the local storage platform 120 or the cloud storage platform 104.

In some cases, accessing a data storage platform (e.g., the cloud storage platform 104 or the local storage platform 120) using the application system 102 requires using credential data associated with the application system 102. For example, to access the cloud storage platform 104 using the application system 102, a requesting user may need to establish an authenticated connection between the application system 102 and the cloud storage platform 104 using credential data associated with the application system 102. As another example, to access the local storage platform 120 using the application system 102, a requesting user may need to cause the application system 102 to provide credential data associated with the application system 102 to the local storage platform 120.

In some cases, data security requirements associated with the application system 102 may require that, when a user uses the application system 102 to access a storage platform based on credential data associated with the application system 102, the credential data is masked such that the user does not have direct access to the credential data and does not know what the credential data entails. For example, if the credential data include an authentication token, the data security requirements associated with the application system 102 may require that, while a user can cause the application system 102 to access a storage platform based on the authentication token, the application system 102 does not display the authentication token to the user.

In some cases, the application system 102 may be enable a group of users (e.g., a group of users associated with an organization and/or a company) to access a target storage platform based on credential data that is shared among the group. In some cases, when credential data needed for accessing a storage platform is shared among a group of users, the data security requirements associated with the application system 102 may require that, when a user in the group uses the application system 102 to access a storage platform based on the shared credential data, the user does not have direct access to the credential data and does not know what the credential data entails. Accordingly, the application system 102 uses techniques for enabling authenticated data retrieval and/or storage using masked credential to enable compliance with one or more data security requirements associated with the application system.

As depicted in FIG. 1, the application system 102 includes an application server 112, a credential data management server 116, and a local storage platform 120. While the example architecture 100 of FIG. 1 can be used to retrieve data from the cloud storage platform 104 and store data (e.g., the data retrieved from the cloud storage platform 104) on the local storage platform 120, a person of ordinary skill in the relevant technology will recognize that the application system 102 can retrieve data from either or both of the cloud storage platform 104 and the local storage platform 120. Moreover, a person of ordinary skill in the relevant technology will recognize that the application system 102 can store data on either or both of the cloud storage platform 104 and the local storage platform 120.

The application server 112 may enable a user to gain user-level access to at least one process associated with an operating system of the application server 112. For example, the application server 112 may be a Linux server that enables a user to gain user-level access to non-root processes associated with a Linux operating system executing on the application server 112.

In some cases, a user is authorized to gain user-level access to a set of processes of the application server 112 as determined based on a set of access parameters associated with the user. For example, the operating system of the application server 112 may enable the user to log in using an access profile that is associated with a set of access parameters, such as an access parameter representing that a user logged into the access profile is authorized to access first data associated with a first process in a read-only mode or an access parameter representing that a user logged into the access profile is authorized to access second data associated with a second process in a read-or-write mode.

In some cases, the access parameters of an access profile represent that a user logged into the access profile is authorized to execute operations associated with a first set of operating system processes of the application server 112 and/or is not authorized to access operations associated with a second set of operating system processes of the application server 112. For example, the access parameters associated with an administrative access profile may represent that an administrator user who is logged into the administrative access profile is authorized to execute operations corresponding to all of the operating system processes of the application server 112. As another example, the access parameters associated with a non-administrative access profile may represent that a non-administrator user who is logged into the non-administrative access profile is authorized to execute operations corresponding to all of the non-root operating system processes of the application server 112.

In some cases, an administrator user associated with an administrative access profile is granted administrator-level access to the application server 112 which enables the administrator user to access all processes executed by the application server 112, including the root process of the application server 112. In some cases, a non-administrator user associated with a non-administrative access profile is granted user-level access to the application server 112 which enables the administrator user to access all processes executed by the application server 112 other than the root process of the application server 112.

As described above, the application system 102 uses techniques for enabling authenticated data retrieval and/or storage based on masked credential to enable compliance with the data security requirements associated with the application system 102. The noted techniques enable authenticated data retrieval and/or storage using masked credential data even when the credential data is stored by an application server 112 to which a user has user-level access privileges. The requirement of masking the credential data stored on an application server 112 to prevent a user who has gained user-level access to the application server 112 presents unique technical challenges that are addressed by the techniques described herein.

The local storage platform 120 may be a storage platform that is not remote to the application system 102 and enables a user of the application system 102 to store and/or retrieve data. The application server 112 may enable a user to perform operations that are configured to retrieve data from and/or store data on the local storage platform. An example of a local storage platform 120 is a locally-stored file hosting platform, such as a locally-stored Microsoft® OneDrive platform.

Additionally, the application server 112 may enable a user to perform operations that are configured to retrieve data from and/or store data on a storage platform (e.g., the cloud storage platform 104 or the local storage platform 120). To enable data retrieval from and/or data storage on a storage platform, the application server 112 enables the user to cause execution of a data retrieval script and/or a data storage script.

A data retrieval script may be configured to establish an authenticated connection with a storage platform and retrieve target data using the established connection. For example, as depicted in FIG. 1, the data retrieval script 114 enables retrieval of data from the cloud storage platform 104. In accordance with some of the techniques described herein, a data retrieval script establishes an authenticated connection using credential data that is stored as a field (e.g., a local variable) of the data retrieval request. Subsequent to establishing the authenticated connection, the data retrieval script uses the authenticated connection to retrieve the target data on the target storage platform. Moreover, subsequent to retrieving the target data, the data retrieval script terminates the authenticated connection.

In accordance with some of the techniques described herein, a data retrieval script is executed by a root process of the application server 112. In some cases, a data retrieval script is executed by a non-root process of the application server 112. In some cases, the authenticated connection established by a data retrieval request is established using a Secure Shell File Transfer Protocol (SFTP) protocol. In some cases, establishing the additional authenticated connection includes providing a field of the data retrieval script (e.g., a field that stores credential data) using a bypass mechanism for a keyboard inactivity requirement of the STFP protocol. In some cases, the bypass mechanism is an SSHPASS mechanism.

A data storage script may be configured to establish an authenticated connection with a storage platform and store target data using the established connection. For example, as also depicted in FIG. 1, the data storage script 118 enables storage of data (e.g., storage of data retrieved using the data retrieval script 114) on the local storage platform. In accordance with some of the techniques described herein, a data storage script establishes an authenticated connection using credential data that is stored as a field (e.g., a local variable) of the data storage request. Subsequent to establishing the authenticated connection, the data storage script uses the authenticated connection to store the target data on the target storage platform. Moreover, subsequent to storage the target data, the data storage script terminates the authenticated connection.

In some cases, a data storage script is executed by a root process of the application server 112. In some cases, a data storage script is executed by a non-root process of the application server 112. In some cases, the authenticated connection established by a data storage request is established using an SFTP protocol. In some cases, establishing the additional authenticated connection includes providing a field of the data storage script (e.g., a field that stores credential data) using a bypass mechanism for a keyboard inactivity requirement of the STFP protocol. In some cases, the bypass mechanism is an SSHPASS mechanism.

In accordance with some of the techniques described herein, to enable data retrieval or storage using an authenticated connection, a data retrieval script or a data storage script retrieves credential data from the credential data management server 116 and uses the retrieved credential data as part of a request to retrieve data and/or store data. For example, the data retrieval script 114 of FIG. 1 may retrieve credential data from the credential data management server 116, use the retrieved credential data to establish an authenticated connection with the cloud storage platform 104, and use the established connection to retrieve data from the cloud storage platform 104. As another example, the data storage script 118 of FIG. 1 may retrieve credential data from the credential data management server 116, use the retrieved credential data to establish an authenticated connection with the local storage platform 120, and use the established connection to store data on the local storage platform 120.

In accordance with some of the techniques described herein, the data access script and/or the data storage script 118 are executed based on a request by a non-administrator user of the application server 112 who is logged into a non-administrative access profile of the application server 112 and/or granted user-level access to the application server 112. Exemplary techniques for executing data retrieval requests and/or data storage requests are described in greater detail below with reference to FIG. 5.

The credential data management server 116 may enable storing and retrieving credential data (e.g., one or more credential tokens) associated with the application system 102. In accordance with some of the techniques described herein, the credential data management server 116 enables controlled access to one or more credential tokens (e.g., passwords, secrets, encryption keys, and/or the like) by authenticating a request for a credential token against one or more trusted sources of identity such as identity sources provided using the Lightweight Directory Access Protocol (LADP). An example of the credential data management server 116 is a HashiCorp Vault server.

While the exemplary architecture 100 of FIG. 1 depicts the credential data management server 116 as being part of the application system 102, a person of ordinary skill in the relevant technology will recognize that the credential data management server 116 could be outside of the application system. For example, the credential data management server 116 may be remote from the application system 102. In some cases, the application server 112 of the application system 102 and the credential data management server 116 are connected using an external network connection.

In some cases, the credential data management server 116 is configured to provide credential data based on (e.g., in response to) a request that is contained within a data retrieval script 114 or a data storage script 118 that is executed by a root process of the application server 112. Accordingly, to retrieve credential data needed for accessing a storage platform from the credential data management server 116, a user of the application server 112 needs to cause execution of a data retrieval script 114 or a data storage script 118 by a root process of an application server. For example, the user can use a non-root process to request that the root process executes a data retrieval script 114 or a data storage script 118. In some cases, requiring that a successful request for retrieval of credential data is provided using a data retrieval or storage script that is executed by a root process of the application server 112 provides a layer of protection against direct access to the credential data by unauthorized users (e.g., by non-administrator users of the application server 112 that do not have access to a root process of the application server).

In some cases, the credential data management server 116 may determine the credential data provided in response to a request for credential data based on at least one of a client identifier associated with the request, an application identifier associated with the request, or a target storage platform associated with the request. In some cases, the credential data management server 116 is configured to retrieve the credential data based on an application identifier associated with the non-root process. In some cases, the credential data management server 116 is configured to retrieve the credential data based on a client identifier associated with the data retrieval request.

For example, the credential data management server 116 may provide first credential data in response to a first request associated with a first script executed by a first client (e.g., a first user, a first company, a first customer, and/or the like), where the execution of the first script is caused by a first user-provided command provided using a first application, and where the first script is configured to retrieve data and/or store data on a first storage platform. As another example, the credential data management server 116 may provide second credential data in response to a second request associated with a second script executed by a second client (e.g., a second user, a second company, a second customer, and/or the like), where the execution of the second script is caused by a second user-provided command provided using a second application, and where the second script is configured to retrieve data and/or store data on a second storage platform.

Accordingly, different client identifiers, different application identifiers, different target storage platforms, or different combination of two or more of the noted features are associated with different credential data. Exemplary organizational schemes for credential data management servers are described in greater detail below with reference to FIG. 6.

Figure 2:
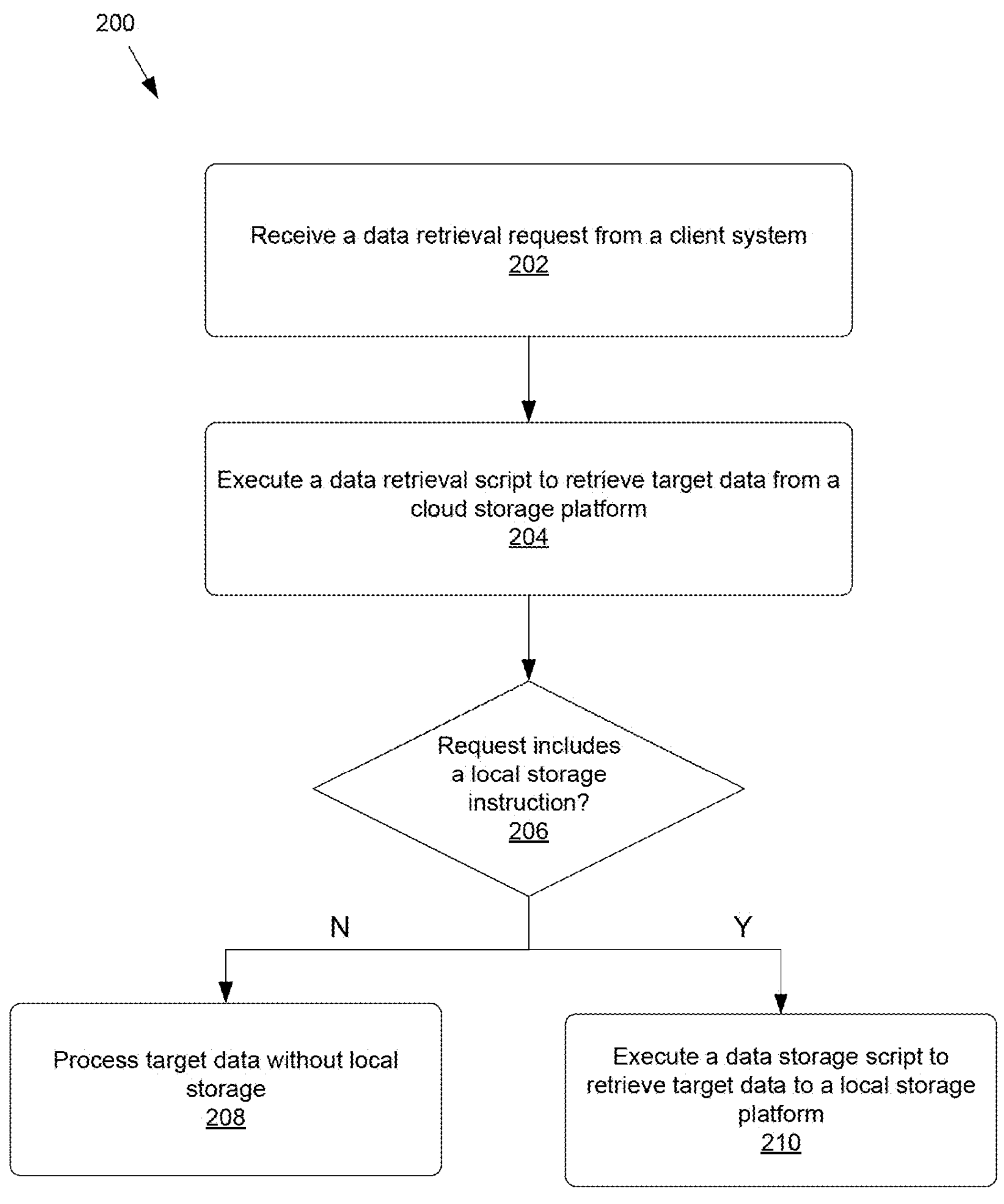
FIG. 2 is a flowchart diagram of an example process for performing an authenticated data retrieval and/or storage.

Thus, the data access script 114 and the data storage script 118 enable authenticated data retrieval and/or storage using an authenticated connection that is established using masked credential data while the user that requests data retrieval and/or storage is granted user-level (as opposed to administrator-level) access to an application server FIG. 2 is a flowchart diagram of an example process 200 for performing an authenticated data retrieval and/or storage. The steps of the process 200 may be performed by any of the processors described herein. However, for discussion purposes, the steps of the process 200 are described as being performed by the application server 112.

At block 202, the application server 112 retrieves a data retrieval request from a client system (e.g., a system used by a user who is granted user-level access to the application server 112). The data retrieval request may represent a request to retrieve target data from the cloud storage platform 104. For example, the data retrieval request may be a request to query a database that is stored on the cloud storage platform 104.

In some cases, the data retrieval request is generated based on a user execution of a non-root process of the application server 112. In some cases, execution of the non-root process causes providing a request to a root process of the application server 112 to execute the data retrieval script 114.

Although the example process 200 of FIG. 2 is described with reference to data retrieval script 114 and data storage script 118 of FIG. 1, a person of ordinary skill in the relevant technology will recognize that the techniques of process 200 can be performed to enable authenticated data retrieval and/or storage using other data retrieval scripts and/or other data storage scripts. For example, the techniques of process 200 can be performed to enable authenticated data retrieval and/or storage using a data retrieval script that is configured to retrieve data from a local storage platform (e.g., the local storage platform 120 of FIG. 1). As another example, the techniques of process 200 can be performed to enable authenticated data retrieval and/or storage using a data retrieval script that is configured to store data on a cloud storage platform (e.g., the cloud storage platform 104 of FIG. 1).

At block 204, the application server 112 executes the data retrieval script 114 to retrieve the target data from the cloud storage platform 104. The data retrieval script 114 may be a computer-implemented routine that is configured to retrieve credential data from the credential data management server 116, use the retrieved credential data to establish an authenticated connection to the cloud storage platform 104, and use the authenticated connection to retrieve target data from the cloud storage platform 104.

To use the retrieved credential data to establish the authenticated connection to the cloud storage platform, the data retrieval script 114 stores the retrieved credential data as a local variable of the data retrieval script 114 that is not provided to any process except for the process that is executing the data retrieval script 114. In some cases, the data retrieval script is executed by a root process of the application server 112. Exemplary structures for a data retrieval script 114 and exemplary techniques for executing a data retrieval script 114 are described in greater detail below with reference to FIGS. 3 and 5 respectively.

In accordance with some of the techniques described herein, the data retrieval script is executed by a root process of the application server. In some cases, the data retrieval script is executed by a non-root process of the application server. The data retrieval script includes the credential data retrieved from the credential data management server. For example, a field of the data retrieval script is determined based on the credential data. In some cases, the field is a local variable of the data retrieval script. In some cases, the credential data management server is configured to retrieve the credential data based on one or more application identifiers associated with the non-root process. In some cases, the credential data management server is configured to retrieve the credential data based on one or more client identifiers associated with the data retrieval request.

At block 206, the application server 112 determines whether the data retrieval request received at block 202 includes an instruction to store the target data on the local storage platform 120. In some cases, the data retrieval request has a flag field that, if set to an affirmative value (e.g., a value of one or true), indicates that the user requests storage of the target data retrieved from the cloud storage platform 104 on the local storage platform 120. In some cases, if the flag field is set to a negative value (e.g., a value of zero or false), this indicates that the user does not request storage of the target data retrieved from the cloud storage platform 104 on the local storage platform 120.

At block 208, the application server 112 processes the target data without storage of the target data on the local storage platform 120 based on (e.g., in response to) determining that the data retrieval request does not include an instruction to store the target data on the local storage platform 120. For example, if the application server 112 determines that the data retrieval request does not include an instruction to store the target data on the local storage platform 120, the application server 112 stores the target data on a random access memory of the application server 112, uses the target data to perform one or more real-time data processing operations, and subsequently discards the target data by deleting the target data from the random access memory.

At block 210, the application server 112 executes the data storage script 118 to store the target data on the local storage platform 120 based on (e.g., in response to) determining that the data retrieval request includes an instruction to store the target data on the local storage platform 120. The data storage script 118 may be a computer-implemented routine that is configured to retrieve credential data from the credential data management server 116, use the retrieved credential data to establish an authenticated connection to the local storage platform 120, and use the authenticated connection to store target data on the local storage platform 120.

In accordance with some of the techniques described herein, the data storage script 118 is executed by a root process of the application server 112. In some cases, the data storage script 118 is executed by a non-root process of the application server 112. In some cases, the authenticated connection established by the data storage script 118 is established using an SFTP protocol. In some cases, establishing the additional authenticated connection includes providing a field of the data storage script (e.g., a field that stores credential data) using a bypass mechanism for a keyboard inactivity requirement of the STFP protocol. In some cases, the bypass mechanism is an SSHPASS mechanism.

In accordance with some of the techniques described herein, to use the retrieved credential data to establish the authenticated connection to the local storage platform 120, the data storage script 118 stores the retrieved credential data as a local variable of the data storage script 118 that is not provided to any process except for the process that is executing the data storage script 118. In some cases, the data storage script is executed by a root process of the application server 112. Exemplary structures for a data storage script 118 as well as exemplary techniques for executing a data storage script 118 are described in greater detail below with reference to FIGS. 4 and 5 respectively.

Figure 3:
FIG. 3 provides an operational example of a structure for an example data retrieval script.
Figure 3:
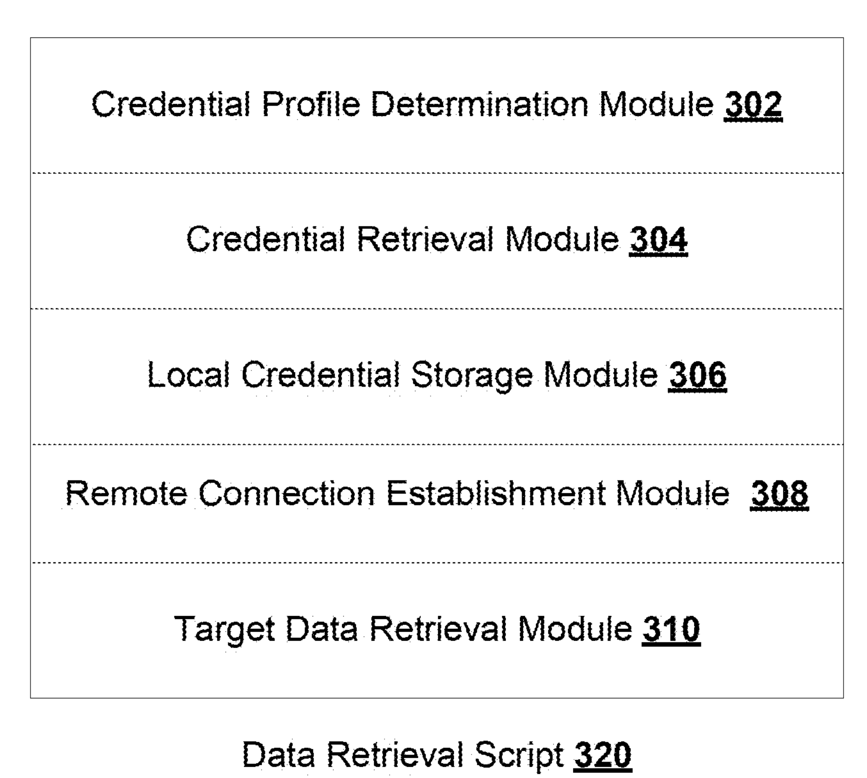

FIG. 3 provides an operational example of a structure 300 for an example data retrieval script 320. As depicted in FIG. 3, the data retrieval script 320 includes a credential profile determination module 302 that is configured to determine a credential profile for a first data retrieval request from a first user. The credential profile represents one or more features of the first data retrieval request and/or the first user that are used to retrieve request-specific and/or user-specific credential data from the credential data management server 116.

In some cases, the credential profile may represent a client identifier associated with the first user and/or an application identifier associated with a software application that was used to generate the first data retrieval request based on one or more actions of the user. For example, the credential data may represent that the first data retrieval request is associated with a user in Company A and was generated after the user requested retrieval of target data using an accounting software application (e.g., an accounting software executing on the client system or on the application server 112).

As further depicted in FIG. 3, the data retrieval script 320 includes a credential retrieval module 304 that is configured to retrieve credential data needed for establishing an authenticated connection with the cloud storage platform 104 from the credential data management server 116. The credential retrieval module 304 may be configured to provide a request for retrieval of credential data needed for establishing the connection with the cloud storage platform 104 to the credential data management server 116 and receive the requested credential data in response to the request. The request for credential data may include the credential profile for the first data retrieval request as determined by the credential profile determination module 302. The credential profile determination module 302 may then be configured to, in response to the request, retrieve credential data associated with the cloud storage platform 104 and the credential profile, and provide the retrieved credential data to the application server 112.

As further depicted in FIG. 3, the data retrieval script 320 includes a local credential storage module 306 that is configured to store the credential data retrieved by the credential retrieval module 304 as a local variable (or other field) of the data retrieval script. In some cases, storing the credential data as a local variable of the data retrieval script 320 prevents any processes other than the process that executes the data retrieval script 320 from accessing the credential data directly. In some cases, by storing the retrieved credential data using a local variable, the credential storage module 306 enables authenticated data retrieval and/or storage using an authenticated connection that is established using masked credential data while the user that requests data retrieval and/or storage is granted user-level (as opposed to administrator-level) access to an application server.

In some cases, the data retrieval script 320 is executed by a root process of the application server 112 that is only accessible to non-administrator users of the application server 112. In some cases, because the data retrieval script 320 is executed by a root process of the application server 112, storing the credential data as a local variable of the data retrieval script 320 prevents any non-administrator users from directly accessing the credential data. In some cases, storing the credential data as a local variable of the data retrieval script 320 prevents display of the credential data on a command line interface if the data retrieval script 320 is executed using a command provided by the command line interface.

As further depicted in FIG. 3, the data retrieval script 320 includes a remote connection establishment module 308 that is configured to establish an authenticated connection with the cloud storage platform 104 using the local variable storing the credential data. In some cases, the local variable is an input parameter of a routine corresponding to the remote connection establishment module 308. In some cases, the remote connection establishment module 308 provides an application programming interface (API) call to the cloud storage platform 104 that includes the local variable and/or an encrypted encoding of the local variable as a parameter of the API call.

As further depicted in FIG. 3, the data retrieval script 320 includes a target data retrieval module 310 that is configured to retrieve target data from the cloud storage platform 104 using the authenticated connection established by the remote connection establishment module 308. In some cases, the target data retrieval module 310 makes a GET-request-type API call to a database API of the cloud storage platform 104. In some cases, subsequent to retrieving all of the target data, the target data retrieval module 310 terminates the authenticated connection established by the remote connection establishment module 308.

Figure 4:
FIG. 4 provides an operational example of a structure for an example data storage script.

FIG. 4 provides an operational example of a structure 400 for an example data storage script 420. As depicted in FIG. 4, the data storage script 420 includes a credential profile determination module 402 that is configured to determine a credential profile for a first data storage request from a first user.

In some cases, the credential profile represents one or more features of the first data storage request and/or the first user that are used to retrieve request-specific and/or user-specific credential data from the credential data management server 116. In some cases, the credential profile may represent a client identifier associated with the first user and/or an application identifier associated with a software application that was used by the user to generate the first data storage request based on one or more actions of the user.

For example, the credential data may represent that the first data storage request is associated with a user in Company A and was generated after the user requested storage of target data using an accounting software application (e.g., an accounting software executing on the client system or on the application server 112). In some cases, the data storage request is part of a data retrieval request. For example, the data storage request may request storage of data retrieved using a data retrieval request. In some cases, the data storage request is independent of a data retrieval request. For example, the data storage request may request storage of data generated using a data processing routine.

As further depicted in FIG. 4, the data storage script 420 includes a credential retrieval module 404 that is configured to retrieve credential data needed for establishing an authenticated connection with the local storage platform 120 from the credential data management server 116. In some cases, the credential retrieval module 404 is configured to provide a request for retrieval of credential data needed for establishing the connection with the local storage platform 120 to the credential data management server 116 and receive the requested credential data in response to the request. In some cases, the request for credential data includes the credential profile for the first data storage request as determined by the credential profile determination module 402. In some cases, the credential profile determination module 402 is configured to, in response to the request, retrieve credential data associated with the local storage platform 120 and the credential profile, and provide the retrieved credential data to the application server 112.

As further depicted in FIG. 4, the data storage script 420 includes a local credential retrieval module 406 that is configured to store the credential data retrieved by the credential retrieval module 404 as a local variable (or other field) of the data storage script 420. In some cases, storing the credential data as a local variable of the data storage script 420 prevents any processes other than the process that executes the data storage script 420 from accessing the credential data directly.

In some cases, the data storage script 420 is executed by a root process of the application server 112 that is only accessible to non-administrator users of the application server 112. In some cases, because the data storage script 420 is executed by a root process of the application server 112, storing the credential data as a local variable of the data storage script 420 prevents any non-administrator users from directly accessing the credential data. In some cases, storing the credential data as a local variable of the data storage script 420 prevents display of the credential data on a command line interface if the data storage script 420 is executed using a command provided by the command line interface.

As further depicted in FIG. 4, the data storage script 420 includes a remote connection establishment module 408 that is configured to establish an authenticated connection with the local storage platform 120 using the local variable storing the credential data. In some cases, the local variable is an input parameter of a routine corresponding to the remote connection establishment module 408. In some cases, the remote connection establishment module 408 provides an API call to the local storage platform 120 that includes the local variable and/or an encrypted encoding of the local variable as a parameter of the API call.

As further depicted in FIG. 4, the data storage script 420 includes a target data storage module 410 that is configured to store target data on the local storage platform 120 using the authenticated connection established by the remote connection establishment module 408. In some cases, the target data storage module 410 makes a PUT-request-type API call to a database API of the local storage platform 120. In some cases, subsequent to storing all of the target data, the target data storage module 410 terminates the authenticated connection established by the remote connection establishment module 408.

Figure 5:
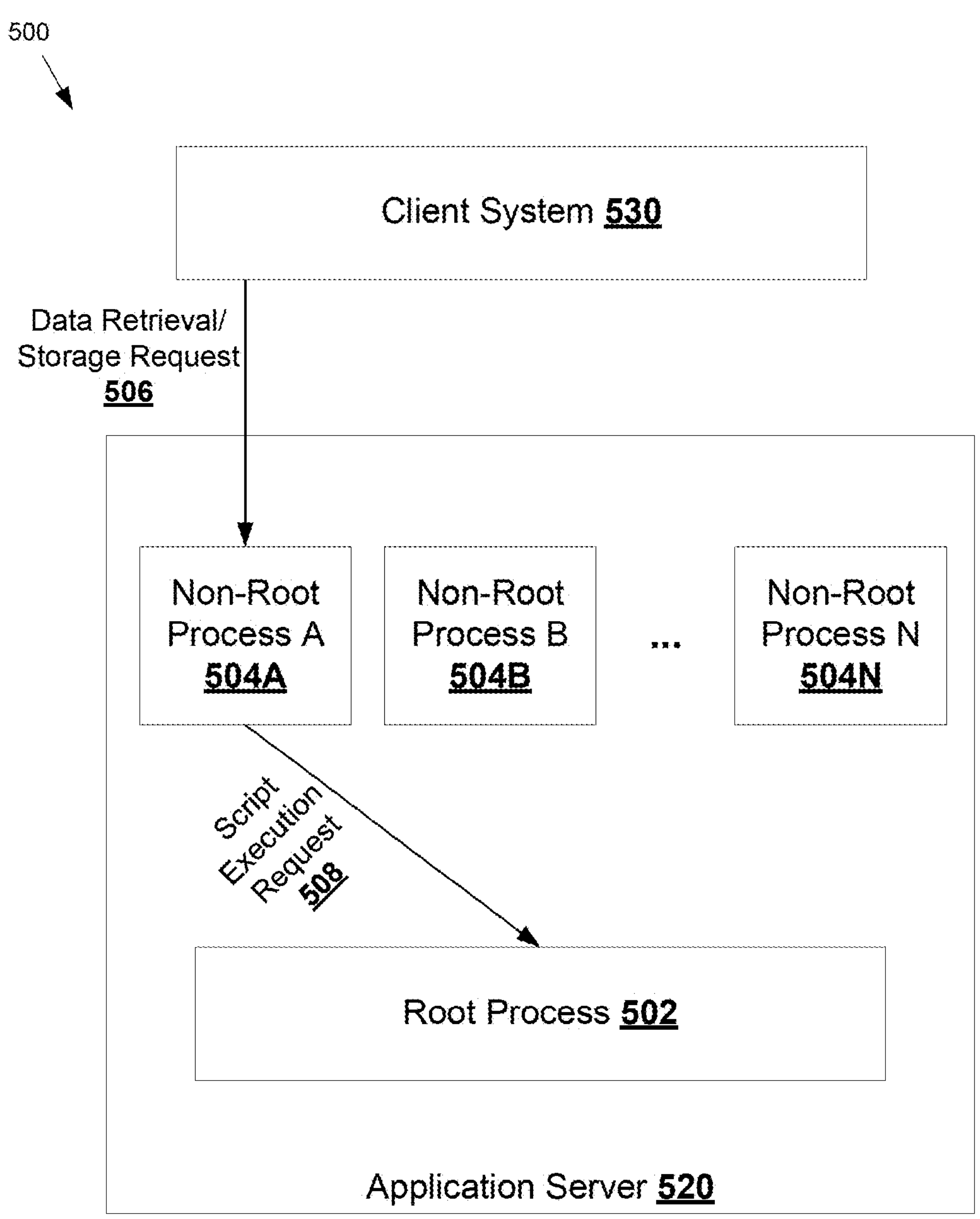
FIG. 5 provides an operational example of a process for executing a data retrieval script or a data storage script.

FIG. 5 provides an operational example of a process 500 for executing a data retrieval script 114 or a data storage script 118. The process 500 may be performed by any of the processors provided herein. However, for discussion purposes only, steps of the process 500 are described as being performed by a client system 530 and the application server 112.

As depicted in FIG. 5, a client system 530 used by a user that has been granted user-level access to the application server 520 provides a data retrieval/storage request 506 to non-root process A 504A which is one of the N non-root processes 504A-504N of the application server 520.

As further depicted in FIG. 5, after receiving the data retrieval/storage request 506, the non-root process A 504A of the application server 112 provides a script execution request 508 to the root process 502 of the application server 112. The script execution request 508 may be a request that the root process 502 executes a data retrieval script or a data storage script.

In some cases, if the client system 530 provides a data retrieval request to a non-root process, the non-root process requests that the root process 502 executes a data retrieval script. In some cases, if the client system 530 provides a data storage request to a non-root process, the non-root process requests that the root process 502 executes a data storage script.

In some cases, if the non-root process requests that the root process 502 executes a data retrieval script, the root process 502 executes the data retrieval request in response to the request received from the non-root process. In some cases, if the non-root process requests that the root process 502 executes a data storage script, the root process 502 executes the data storage request in response to the request received from the non-root process.

Figure 6:
FIG. 6 provides an operational example of an organizational structure for a credential data management server.

FIG. 6 provides an operational example of an organizational structure 600 for a credential data management server 620. As depicted in FIG. 6, the credential data management server 620 stores particular credential data for each combination of an application identifier, a client/user identifier, and a target storage platform.

For example, as depicted in FIG. 6, credential data 602 is provided in response to requests for credential data of the cloud storage platform 104 that originate from the application identifier App1 and the client/user identifier User1. As another example, as depicted in FIG. 6, credential data 604 is provided in response to requests for credential data of the local storage platform 120 that originate from the application identifier App1 and the client/user identifier User1. As an additional example, as depicted in FIG. 6, credential data 606 is provided in response to requests for credential data of the cloud storage platform 104 that originate from the application identifier App1 and the client/user identifier User2. As yet another example, as depicted in FIG. 6, credential data 608 is provided in response to requests for credential data of the local storage platform 120 that originate from the application identifier App1 and the client/user identifier User2. As a further example, as depicted in FIG. 6, credential data 610 is provided in response to requests for credential data of the cloud storage platform 104 that originate from the application identifier App2 and the client/user identifier User1. As yet another example, as depicted in FIG. 6, credential data 612 is provided in response to requests for credential data of the local storage platform 120 that originate from the application identifier App2 and the client/user identifier User1.

Figure 7:
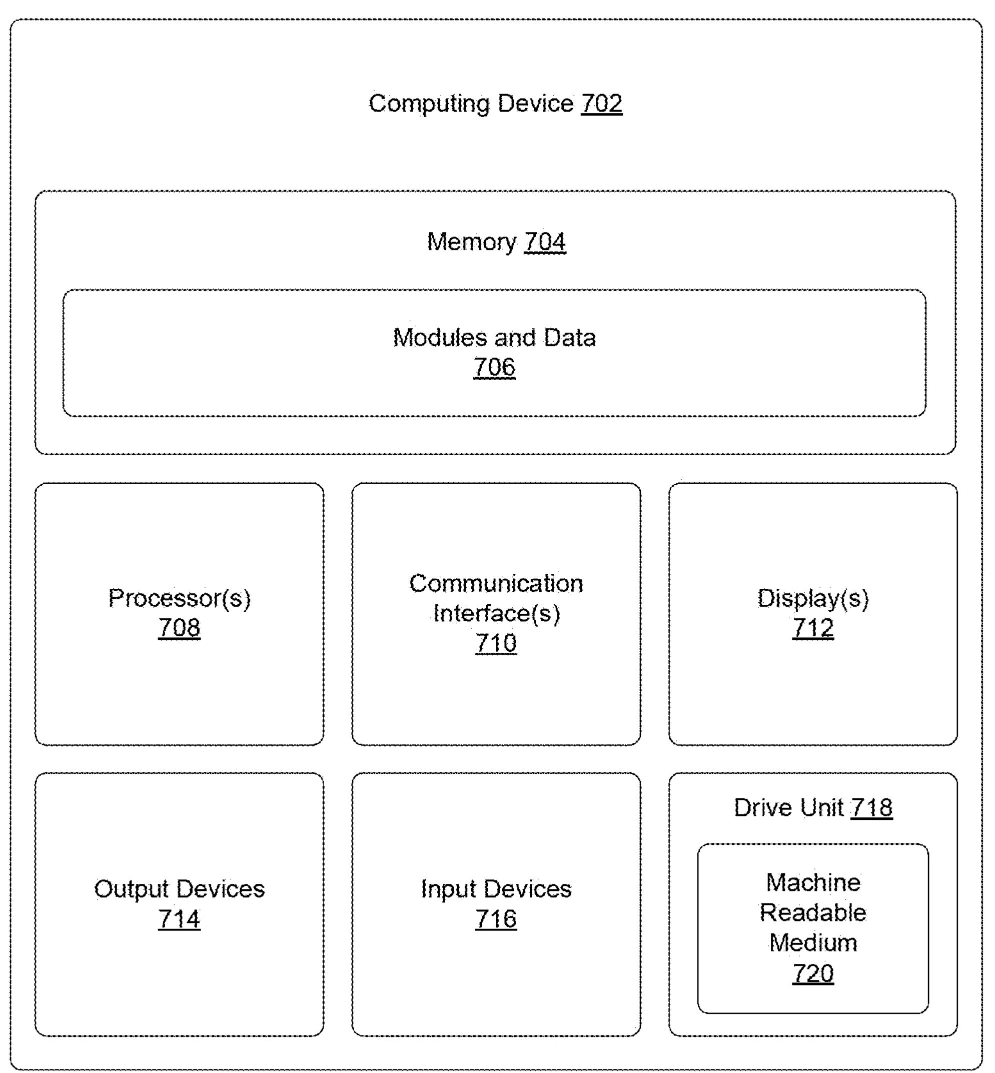
FIG. 7 shows an example system architecture for a computing device associated with the architecture described herein.

FIG. 7 shows an example system architecture for a computing device 702 associated with the architecture 100 described herein. A computing device 702 can be a server, computer, or other type of computing device that executes at least a portion of the architecture 100. In some examples, elements of the architecture 100 can be distributed among, and/or be executed by, multiple computing devices 702.

A computing device 702 can include memory 704. In various examples, the memory 704 can include system memory, which may be volatile (such as RAM), non-volatile (such as ROM, flash memory, etc.) or some combination of the two. The memory 704 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media.

Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by one or more computing devices 702 associated with the architecture 100. Any such non-transitory computer-readable media may be part of the computing devices 702. The memory 704 can include modules and data 706 needed to perform operations of one or more computing devices 702 of the architecture 100.

One or more computing devices 702 of the architecture 100 can also have processor(s) 708, communication interfaces 710, displays 712, output devices 714, input devices 716, and/or a drive unit 718 including a machine readable medium 720.

In various examples, the processor(s) 708 can be a central processing unit (CPU), a graphics processing unit (GPU), both a CPU and a GPU, or any other type of processing unit. Each of the one or more processor(s) 708 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 708 may also be responsible for executing computer applications stored in the memory 704, which can be associated with common types of volatile (RAM) and/or nonvolatile (ROM) memory.

The communication interfaces 710 can include transceivers, modems, interfaces, antennas, telephone connections, and/or other components that can transmit and/or receive data over networks, telephone lines, or other connections.

The display 712 can be a liquid crystal display or any other type of display commonly used in computing devices. For example, a display 712 may be a touch-sensitive display screen, and can then also act as an input device or keypad, such as for providing a soft-key keyboard, navigation buttons, or any other type of input.

The output devices 714 can include any sort of output devices known in the art, such as a display 712, speakers, a vibrating mechanism, and/or a tactile feedback mechanism. Output devices 714 can also include ports for one or more peripheral devices, such as headphones, peripheral speakers, and/or a peripheral display.

The input devices 716 can include any sort of input devices known in the art. For example, input devices 716 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 720 can store one or more sets of instructions, such as software or firmware, that embodies any one or more of the methodologies or functions described herein. The instructions can also reside, completely or at least partially, within the memory 704, processor(s) 708, and/or communication interface(s) 710 during execution thereof by the one or more computing devices 702 of the architecture 100. The memory 704 and the processor(s) 708 also can constitute machine readable media 720.

Accordingly, to enable data retrieval or storage using masked credential data while granting user-level access to the requesting user, an application server 112 performs operations that enable: (i) storing credential data in a credential data management server that is separate from the application server, (ii) executing a data retrieval script or a data storage script using a root process of the application server that is not accessible by a user that is given user-level access to the application server, and (iii) storing credential data retrieved from a credential data management server as a local variable of a data retrieval script or a data storage script. Each of the noted capabilities adds a layer of protection to data retrieval or storage operations. For example, storing credential data on a credential data management server that is separate from an application server on which a user of the application system has user-level access privileges provides a first layer of protection against direct access to the credential data by unauthorized users (e.g., by non-administrator users of the application server that do not have access to a root process of the application server). As another example, requiring that a successful request for retrieval of credential data is provided using a data retrieval or storage script that is executed by a root process of the application server provides a second layer of protection against direct access to the credential data by unauthorized users (e.g., by non-administrator users of the application server that do not have access to a root process of the application server). As a further example, storing credential data retrieved using a data retrieval or storage script in a local variable of the script provides a third layer of protection against direct access to the credential data by unauthorized users (e.g., by non-administrator users of the application server that do not have access to a root process of the application server). Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:

receiving, by a processor of an application server, via executing a non-root process, and from a client device operated by a user having a first access level, a data retrieval request associated with accessing target data stored on a cloud storage platform;

providing, by the processor and via executing the non-root process, a script execution request to a root process having a second access level, wherein the second access level is greater than the first access level, and wherein the root process is configured to, based on receiving the script execution request:

execute a data retrieval script to perform operations comprising:

providing a credential data request associated with the data retrieval request and the cloud storage platform to a credential data management server;

based on the credential data request, receiving credential data from the credential data management server, wherein:

the credential data comprises a credential token, the credential data is needed for establishing an authenticated connection, and the credential data management server is configured to prevent access to the credential data by the non-root process based on the non-root process being non-root;

storing the credential data in a field of a data retrieval script; and executing the data retrieval script based on the field, wherein executing the data retrieval script comprises:

establishing the authenticated connection between the root process and the cloud storage platform using the credential data comprising the credential token, and accessing the target data using the authenticated connection;

providing, by the processor via the root process, the target data to the non-root process; and receiving, by the processor, via executing the non-root process, and from the root process, the target data.

2. The computer-implemented method of claim 1, wherein the field is a local variable of the data retrieval script.

3. The computer-implemented method of claim 1, wherein the credential data management server is configured to retrieve the credential data based on an application identifier associated with the non-root process.

4. The computer-implemented method of claim 1, wherein the credential data management server is configured to retrieve the credential data based on a client identifier associated with the data retrieval request.

5. The computer-implemented method of claim 1, further comprising:

receiving, by the processor and from the client device, a data storage request associated with storing the target data in a local storage platform, wherein the local storage platform comprises a component of an application system, and the application system also comprises the application server;

providing, by the processor, an additional credential data request associated with the data storage request and the local storage platform to the credential data management server;

based on the additional credential data request, receiving, by the processor, additional credential data from the credential data management server;

storing, by the processor, the additional credential data in a field of a data storage script; and executing, by the processor, the data storage script based on the field of the data storage script, wherein executing the data storage script comprises establishing an additional authenticated connection with the local storage platform and storing the target data using the additional authenticated connection.

6. The computer-implemented method of claim 5, wherein the additional authenticated connection is established using a Secure Shell File Transfer Protocol (SFTP) protocol.

7. The computer-implemented method of claim 6, wherein establishing the additional authenticated connection comprises providing the field of the data storage script using a bypass mechanism for a keyboard inactivity requirement of the STFP protocol.

8. The computer-implemented method of claim 7, wherein the bypass mechanism is an SSHPASS mechanism.

9. The computer-implemented method of claim 5, wherein the application system further comprises the credential data management server and the cloud storage platform is outside of the application system.

10. The computer-implemented method of claim 1, wherein:

the data retrieval script is executed by a first process of the application server; and the application server is configured to prevent processes other than the first process from accessing the credential data.

11. A computing system, comprising:

a processor of an application server; and memory storing computer-executable instructions that, when executed by the processor, cause the computing system to perform operations comprising:

receiving, by the processor, via executing a non-root process, and from a client device operated by a user having a first access level, a data retrieval request associated with accessing target data stored on a cloud storage platform;

providing, by the processor and via executing the non-root process, a script execution request to a root process having a second access level, wherein the second access level is greater than the first access level, and wherein the root process is configured to, based on receiving the script execution request:

execute a data retrieval script to perform operations comprising:

providing a credential data request associated with the data retrieval request and the cloud storage platform to a credential data management server;

based on the credential data request, receiving credential data from the credential data management server, wherein;

the credential data comprises a credential token, the credential data is needed for establishing an authenticated connection, and the credential data management server is configured to prevent access to the credential data by the non-root process based on the non-root process being non-root;

storing the credential data in a field of the data retrieval script; and executing the data retrieval script based on the field, wherein executing the data retrieval script comprises:

establishing the authenticated connection between the root process and cloud storage platform using the credential data comprising the credential token, and accessing the target data using the authenticated connection;

provide the target data to the non-root process; and receiving, by the processor executing the non-root process and from the root process, the target data.

12. The computing system of claim 11, wherein the field is a local variable of the data retrieval script.

13. The computing system of claim 11, wherein the credential data management server is configured to retrieve the credential data based on a client identifier associated with the data retrieval request.

14. The computing system of claim 11, the operations further comprising:

receiving, by the processor and from the client device, a data storage request associated with storing the target data in a local storage platform, wherein the local storage platform comprises a component of an application system, and the application system also comprises the application server;

providing, by the processor, an additional credential data request associated with the data storage request and the local storage platform to the credential data management server;

based on the additional credential data request, receiving, by the processor, additional credential data from the credential data management server;

storing, by the processor, the additional credential data in a field of a data storage script; and executing, by the processor, the data storage script based on the field of the data storage script, wherein executing the data storage script comprises establishing an additional authenticated connection with the local storage platform and storing the target data using the additional authenticated connection.

15. One or more non-transitory computer-readable media storing computer-executable instructions that, when executed by a processor of an application server, cause the processor to perform operations:

receiving, by the processor, executing a non-root process, and from a client device operated by a user having a first access level, a data retrieval request associated with accessing target data stored on a cloud storage platform;

providing, by the processor executing the non-root process, a script execution request to a root process having a second access level, wherein the second access level is greater than the first access level, and wherein the root process is configured to, based on receiving the script execution request:

execute a data retrieval script to perform first operations comprising:

providing a credential data request associated with the data retrieval request and the cloud storage platform to a credential data management server;

based on the credential data request, receiving credential data from the credential data management server, wherein:

the credential data comprises a credential token, the credential data is needed for establishing an authenticated connection, and the credential data management server is configured to prevent access to the credential data by the non-root process based on the non-root process being non-root;

storing the credential data in a field of the data retrieval script; and executing the data retrieval script based on the field, wherein executing the data retrieval script comprises:

establishing the authenticated connection between the root process and the cloud storage platform using the credential data comprising the credential token, and accessing the target data using the authenticated connection; and providing, by the processor via the root process, the target data to the non-root process; and receiving, by the processor executing the non-root process and from the root process, the target data.

16. The one or more non-transitory computer-readable media of claim 15, the operations further comprising:

receiving, by the processor and from the client device, a data storage request associated with storing the target data in a local storage platform, wherein the local storage platform comprises a component of an application system, and the application system also comprises the application server;

providing, by the processor, an additional credential data request associated with the data storage request and the local storage platform to the credential data management server;

based on the additional credential data request, receiving, by the processor, additional credential data from the credential data management server;

storing, by the processor, the additional credential data in a field of a data storage script; and executing, by the processor, the data storage script based on the field of the data storage script, wherein executing the data storage script comprises establishing an additional authenticated connection with the local storage platform and storing the target data using the additional authenticated connection.

* * * * *